United States Patent [19]
Walther

[11] 4,065,186
[45] Dec. 27, 1977

[54] DUAL FLANGED WIDE BASE TIRE CARRYING RIM AND WHEEL

[75] Inventor: William D. Walther, Kettering, Ohio

[73] Assignee: Dayton-Walther Corporation, Dayton, Ohio

[21] Appl. No.: 758,451

[22] Filed: Jan. 11, 1977

Related U.S. Application Data

[63] Continuation-in-part of Ser. No. 592,501, July 9, 1975, abandoned, and Ser. No. 592,502, July 9, 1975, abandoned.

[51] Int. Cl.² ............................................ B60B 23/10
[52] U.S. Cl. .................................. 301/12 R; 301/19; 301/97
[58] Field of Search ............. 301/10 R, 11 R, 11 CD, 301/11 S, 12 R, 13 R, 13 SM, 19-20, 22, 35 SS, 35 SL, 96-97, 63 D, 23-24; 152/396-398, 406-410

[56] References Cited

U.S. PATENT DOCUMENTS

| 1,249,922 | 12/1917 | Doyle | 301/22 |
| 1,652,433 | 12/1927 | Forsyth | 301/11 R |

FOREIGN PATENT DOCUMENTS

| 579,681 | 8/1924 | France | 301/11 R |

Primary Examiner—Robert B. Reeves
Assistant Examiner—Charles A. Marmor
Attorney, Agent, or Firm—Mack D. Cook, II

[57] ABSTRACT

A wide base drop center rim seated and locked by fastening assemblies on a vehicle wheel. A wheel has two series of spoke members with dimensioned felloe surfaces for mating engagement with coacting surfaces on two axially spaced-apart radially inwardly projecting mounting flanges integrally attached to and mounted beneath a base portion of the rim. A rim is mounted in mating, seating or full surface engagement with coacting felloe surfaces of the rim and wheel by full tightening of the fastening assemblies.

4 Claims, 9 Drawing Figures

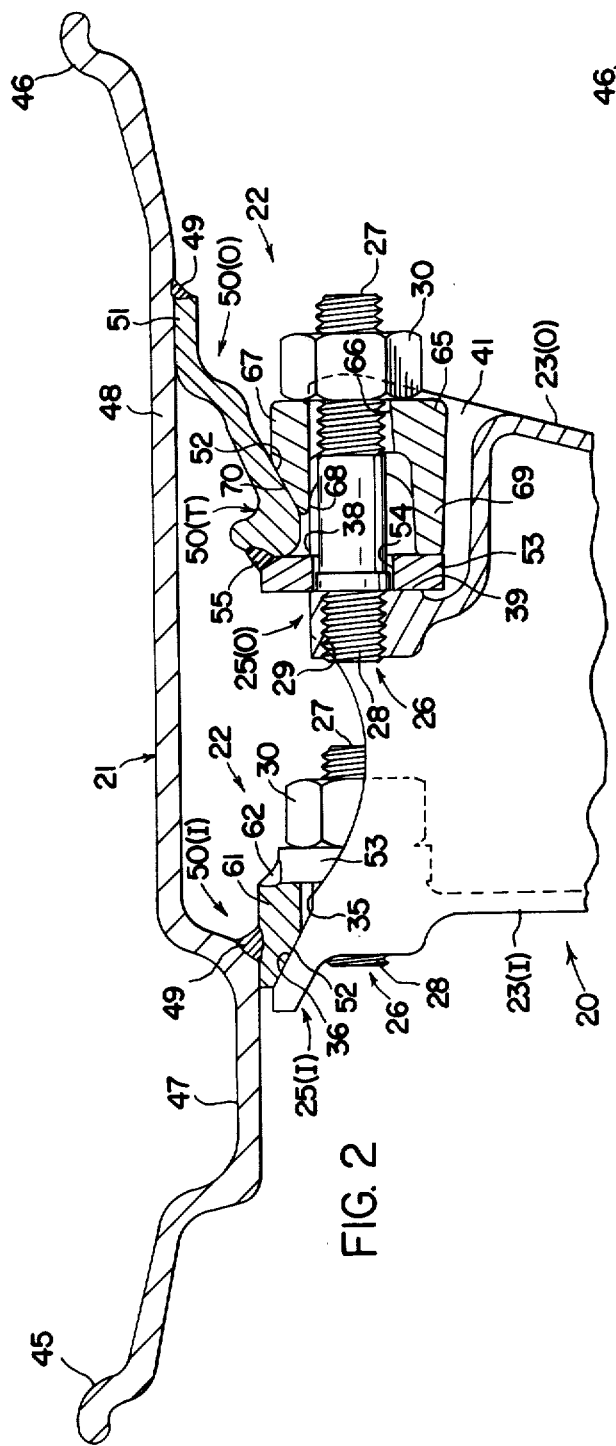
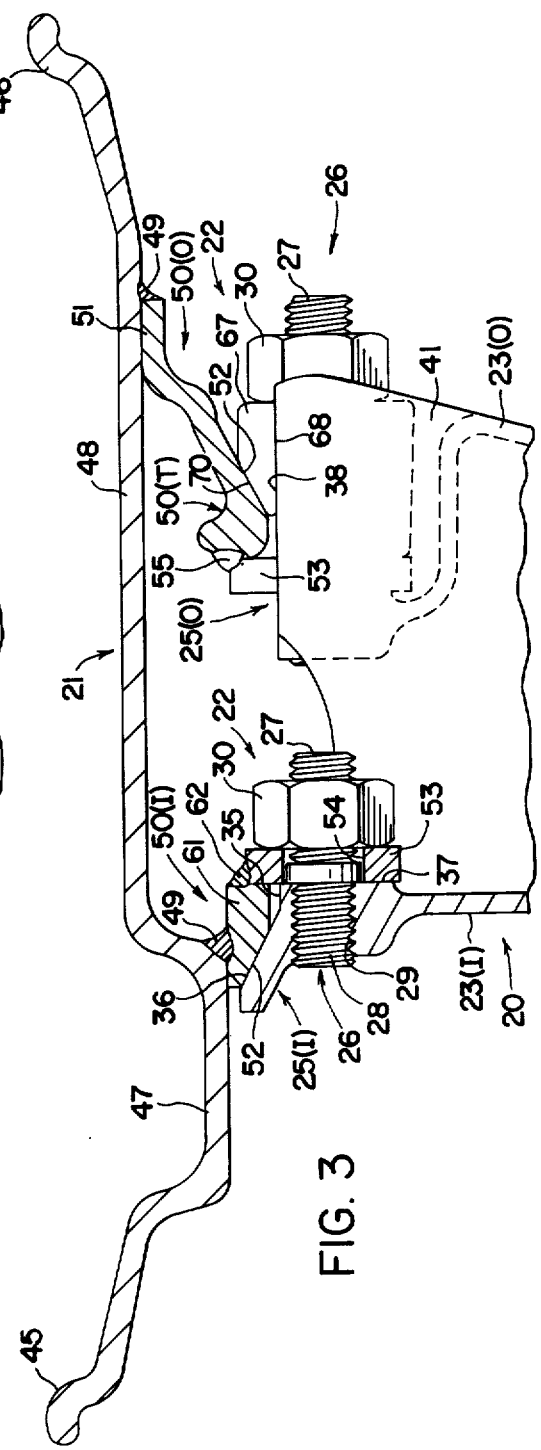
FIG. 2
FIG. 3

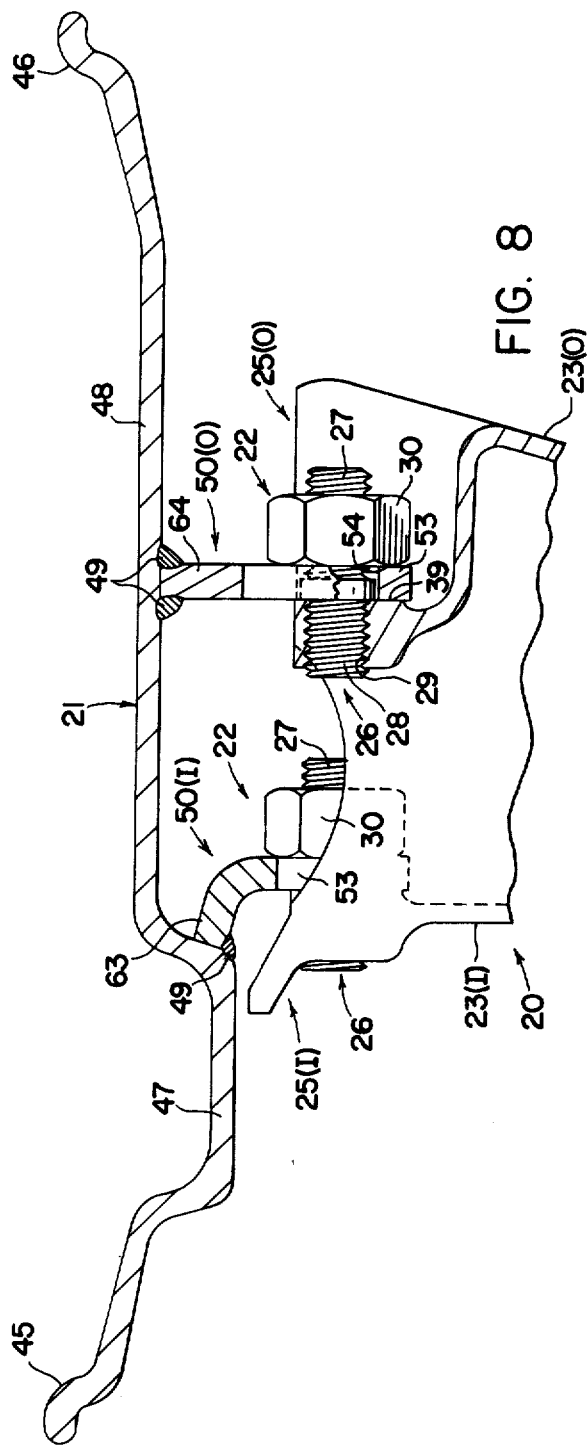
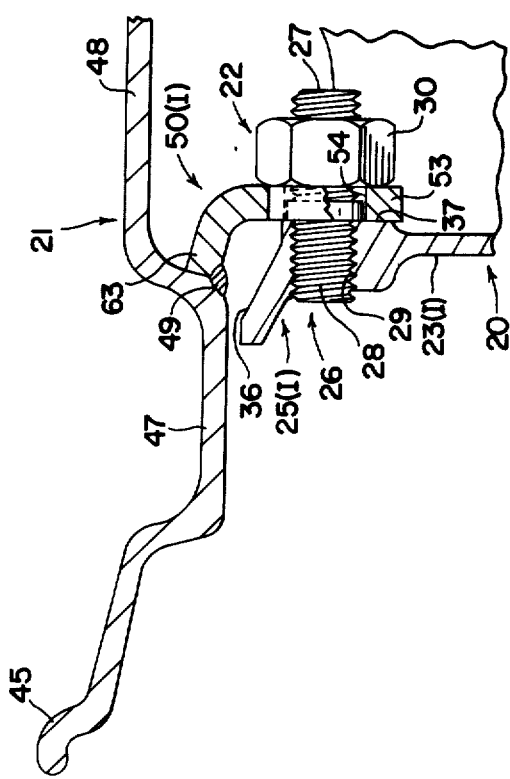
FIG. 8
FIG. 9

DUAL FLANGED WIDE BASE TIRE CARRYING RIM AND WHEEL

BACKGROUND OF THE INVENTION

This application is a continuation-in-part of two U.S. applications, both filed July 9, 1975; Ser. No. 592,501 for a Vehicle Wheel, now abandoned; and, Ser. No. 592,502 for a Base Flanged Tire Carrying Rim and Wheel, now abandoned.

The present invention relates to a combination of a wide base drop center tire carrying rim mounted on a vehicle wheel by full tightening of fastening assemblies.

A wide based tire is normally used as a substitute or replacement for dual mounted tires on transport or heavy duty trucks, tractors or trailers.

A wheel used according to the invention was originally designed for the mounting of dual inner and outer rims. It has now been found that such a wheel may also be used for the mounting of a wide base drop center rim without significant modification. Therefore, the same basic wheel can be used either as disclosed herein or for dual mounted rims. Such a wheel has two series of alternating spoke members, each series having an axially spaced-apart and staggered relation to the other series. Each of the spoke members have a felloe comprising a radially directed surface.

A wide base drop center rim according to the invention may have two axially spaced-apart mounting flanges. A mounting flange may be radially inwardly projecting and have a radially directed terminal portion for mating engagement with the radially directed wheel felloe surfaces.

The prior art relating to tire carrying rims demountably carried on vehicle wheels includes patents to be found in Class 301 beginning with Subclasses 10R. Other relevant patents may be found in Class 152, Subclasses 352 and 406X eg seg.

The accurate mounting of tire carrying rims on the felloe, felly or load-bearing portion of a wheel has long been a problem in the art. Vehicle operators and industry regulations seek longer tire life and complete safety in operation, even under the most severe of vehicle operating conditions. The tire manufacturers are endeavoring to provide tires which have optimum performance characteristics, including lateral and radial balance. Consequently, it is being required that this art provide elements, the wheels, the rims, and fastening assemblies or means therefor, which do not deteriorate, hinder or impair the projected performance characteristics of the tires.

Heretofore, the spoked wheel structure of a tire-rim-wheel assembly has been regarded primarily as a load carrying element attached to an axle of the vehicle and carrying the rim. The periphery of the wheel had felly surfaces to pilot or guide the rim into approximate mounting position. Thereafter, fastening assemblies or means were torqued down or tightened in such a manner that the carrying rim would not come loose from the wheel during use. If done correctly, as by an expert and conscientious mechanic, the prior art rim mounting techniques would not deteriorate, hinder or impair the performance characteristics of the tires. However, environmental or extrinsic factors such as warpage, deformation or damage to the rim and spacer or wear of the fastening assemblies or means could lead to relative displacement or non-alignment of the assembly components during fastening, creating conditions of what are now commonly referred to as excessive lateral (axial) or radial runout, or an inbalance of the tire-rim-wheel assembly during vehicle operation.

The concepts of the invention provide wheel spoke members with proportioned or dimensioned felloe surfaces for mating, seating or full surface engagement with coacting surfaces on the dual rim mounting flanges by full tightening of the fastening assemblies.

A wide based drop center rim with two mounting flanges and fastening assemblies therefor, when used with wheels adapted thereto, positively controls and reduces lateral (axial) and radial runout, resists rim warpage or deformation, restricts rim rotation relative to the wheel and provides better balance for the tire-rim-wheel assembly during vehicle operation.

SUMMARY OF THE INVENTION

The object of the invention is to provide an improved combination of a wide based drop center tire carrying rim seated and locked by fastening assemblies on a vehicle wheel.

It is a further object of the invention to provide a combination of a wide base drop center tire carrying rim seated and locked by fastening assemblies on a vehicle wheel which positively controls and reduces lateral (axial) and radial runout, resists rim warpage or deformation, restricts rim rotation relative to the wheel and provides better balance for the tire-rim-wheel assembly during vehicle operation.

In general, an improved wheel according to the invention has two series of axially spaced-apart and staggered, alternating inner and outer, spoke members. Each of the inner spoke members has a felloe comprising a radially inclined outer surface and an adjacent radially directed surface extending inwardly substantially perpendicular to the rotational axis of said wheel and providing a mounting location for an axially projecting component of a fastening assembly. Each of the outer spoke members has a felloe comprising radially outer spaced-apart axially projecting wing portions providing outwardly facing dual axially oriented surfaces and a radially directed surface oriented transversely between the axially oriented surfaces substantially perpendicular to the rotational axis of the wheel and providing a mounting location for an axially projecting component of a fastening assembly.

In general, a tire carrying rim according to the invention has bead flanges projecting radially outwardly from a rim base comprising a well portion and a lateral portion between the bead flanges. The rim has two axially spaced-apart inner and outer radially inwardly projecting mounting flanges integrally attached to the well portion and the lateral portion. Each mounting flange preferably has a radially directed terminal portion substantially perpendicular to the rotational axis of the rim with a series of bores therein for receiving an axially projecting component of a fastening assembly.

In several embodiments, a rim according to the invention has a mounting flange with a medial portion comprising a radially inclined surface. The medial portion and terminal portion are functionally connected by a transitional portion. These mounting flanges are proportioned or dimensioned such that during final tightening of a fastening assembly, the medial, transitional and terminal portions will be placed under load and thereby elastically stressed or minutely deformed relative to the plane of a series of radially directed wheel felloe surfaces in full surface engagement with the terminal portion of the mounting flange. In another embodiment, the mounting flange attached to a rim base well portion comprises an annular ring having the terminal portion at the axially outer end thereof. In one embodiment, the inner mounting flange may be an annular ring with a radially inclined surface and no terminal portion.

In general, each fastening assembly for an inner mounting flange will have a threaded fastener for bearing engagement against the flange terminal portion.

In several embodiments, each fastening assembly for an outer mounting flange will have a threaded fastener and a clamp element supported thereon. Each clamp element will have lateral wing portions for mating engagement with the outwardly facing felloe surfaces, an axially inwardly directed member for mating engagement with the flange terminal portion, and a radially outer portion with a radially inclined surface for mating engagement with the radially inclined surface on the mounting flange.

According to the invention, when an inner mounting flange has a medial portion comprising a radially inclined surface and a terminal portion functionally connected by a transitional portion, the flange is seated on, and thereafter locked on, the inner series of spoke members by initial and final tightening of fastening assemblies against the flange terminal portion. During initial tightening of the fastening assemblies, the radially inclined mounting flange surface will seat in concentric radial registry with the series of radially inclined wheel felloe surfaces. Final tightening of the fastening assemblies to apply a compression load will lock the mounting flange on the wheel, in axial and radial alignment and registry relative to the rotational axis of rim and wheel, by the full surface engagement of the mounting flange terminal portion with the series of radially directed wheel felloe surfaces and the elastic deformation of the mounting flange medial, transitional and terminal portions relative to the substantially perpendicular plane of the radially directed wheel felloe surfaces.

According to the invention, when an outer mounting flange has a medial portion comprising a radially inclined surface and a terminal portion functionally connected by a transitional portion, the flange is seated on, and thereafter locked on, the outer series of spoke members by initial and final tightening of fastening assemblies against the flange medial and terminal portions. During initial tightening of the fastening assemblies, the radially inclined mounting flange surface will seat in concentric radial registry with the radially inclined surfaces on the radially outer clamp element portions, the lateral wing clamp element portions being in mating engagement with the outwardly facing dual axially oriented wheel felloe surfaces. Final tightening of the fastening assemblies to apply a tension load will lock the mounting flange on the wheel, in axial and radial alignment and registry relative to the rotational axis of rim and wheel, by the full surface engagement of the mounting flange terminal portion with the series of radially directed wheel felloe surfaces and the elastic deformation of the mounting flange medial, transitional and terminal portions relative to the substantially perpendicular plane of the radially directed wheel felloe surfaces.

DESCRIPTION OF THE DRAWINGS

FIG. 2 is a sectional view, taken substantially as indicated on line 2—2 of FIG. 1;

FIG. 3 is a companion view to FIG. 2, taken substantially as indicated on line 3—3 of FIG. 1;

FIG. 8 is a sectional view, similar to FIG. 3 or FIG. 5, of still another form of tire carrying rim seated and locked by fastening assemblies on a wheel felloe according to the invention; and FIG. 9 is a fragmentary sectional view, similar to FIG. 6, of the tire carrying rim of FIG. 8.

DETAILED DESCRIPTION OF THE INVENTION

Figure 1:
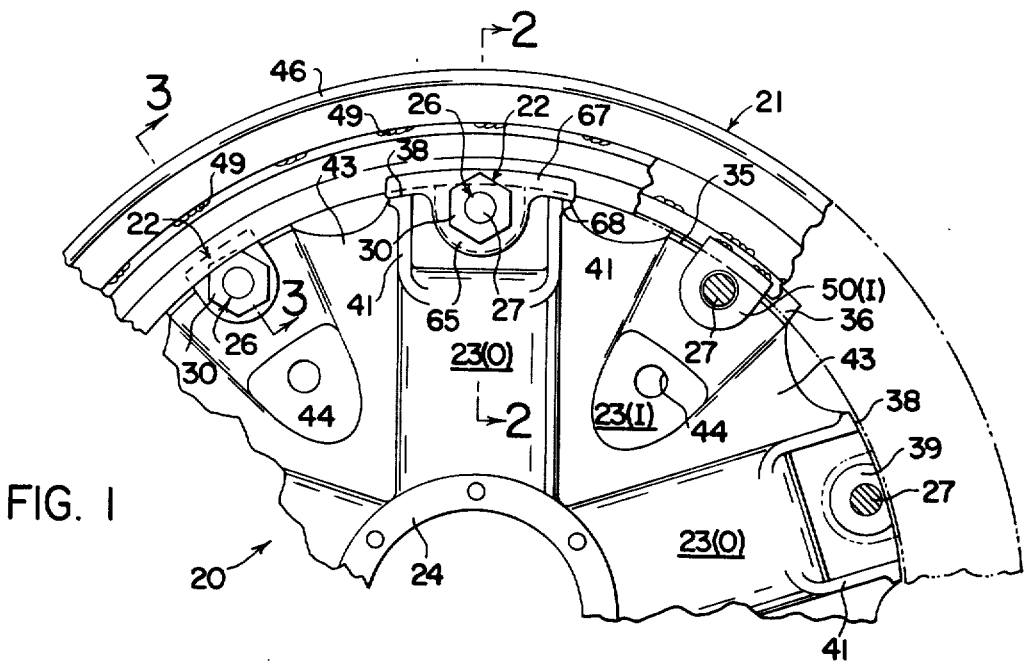
FIG. 1 is a fragmentary front or plan view of a combination of a tire carrying rim seated and locked by fastening assemblies on a wheel according to the invention.

A wheel for use with a tire carrying rim according to the invention is referred to generally by the numeral 20. A tire carrying rim according to the invention is referred to generally by the numeral 21. The fastening assemblies which are tightened for seating and locking of a rim 21 on a wheel 20 are referred to generally by the numeral 22.

A wheel 20 has two series of alternating inner and outer spoke members referred to generally by the numeral 23. The spoke members 23 extend radially from a conventional hub area 24 adapted for attachment of the wheel 20 to a vehicle axle (not shown). The inner series of spoke members, as indicated by 23(I), have an axially spaced-apart and staggered relation to the outer series of spoke members, as indicated by 23(O).

Each spoke member 23 terminates in a felloe, felly or load-bearing portion, referred to generally by the numeral 25. The inner series of felloe portions are indicated by 25(I). The outer series of felloe portions are indicated by 25(O).

Each wheel felloe 25 may have a predetermined mounting location, indicated generally at 26, for the axially projecting component of a fastening assembly 22.

As shown, the axially projecting component of each fastening assembly 22 is threaded stud 27 having an inner end with peripheral threads 28 for mating engagement with bore threads 29 and carrying a rotatable nut 30. Alternatively, the stud 27 may be attached to the felloe portions at the mounting locations 26, as by conventional arc stud or capacitor-discharge welds. Or, the axially projecting component of a fastening assembly 22 may be the shank of a conventional cap head bolt having peripheral threads for mating engagement with the bore threads 29.

The inner series of the felloe portions 25(I) have an axially oriented surface 35 intersecting a radially inclined surface 36. An adjacent radially directed surface 37 extends inwardly substantially perpendicular to the rotational axis of the wheel 20 and provides the mounting location 26 for an axially projecting component of a fastening assembly 22.

The outer series of felloe portion 25(O) have axially oriented surfaces 38 extending substantially parallel to the rotational axis of the wheel 20. Each surface 38 intersects a radially directed surface 39. A surface 39 is oriented transversely between the surfaces, extends inwardly substantially perpendicular to the rotational axis of the wheel 20 and provides the mounting location 26 for an axially projecting component of a fastening assembly 22. Each wheel felloe portion 25(O) has spaced-apart axially projecting wing portions 41 providing for outwardly facing dual axially oriented surfaces 38.

Figure 4:
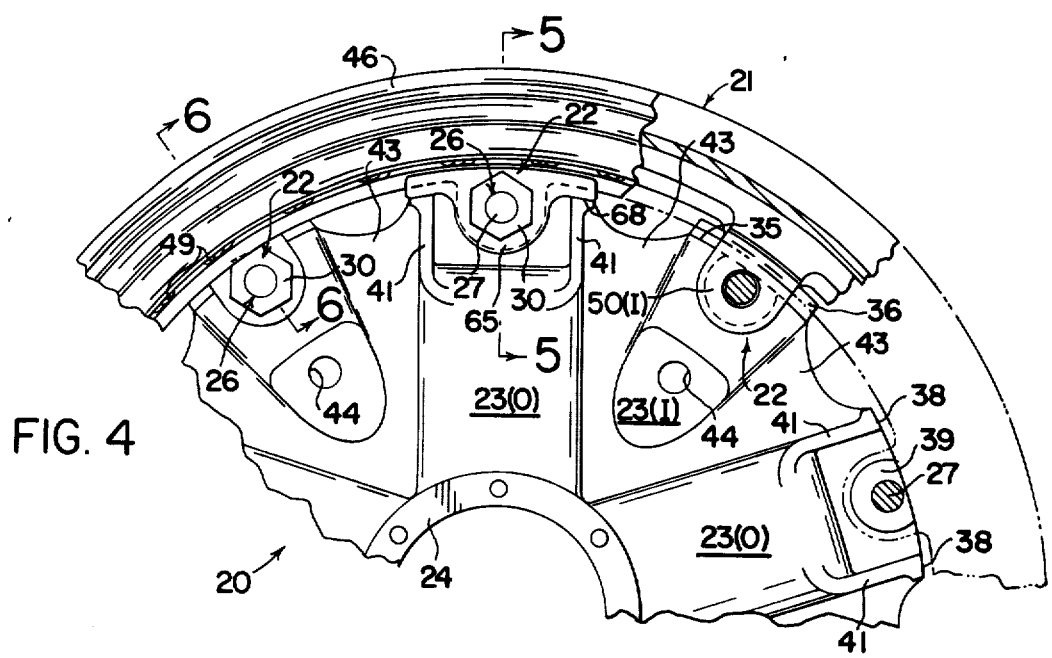
FIG. 4 is a view, similar to FIG. 1, of a combination of another form of tire carrying rim seated and locked by fastening assemblies on a wheel according to the invention.

As shown in FIGS. 1 and 4, the inner and outer series of spoke members 23(I) and 23(O) may be interconnected by integrally formed web members 43 for strengthening the wheel 20 or for asthetic and styling purposes. Also as shown, the dual axially projecting wing portions 41 may be extended radially inwardly along a spoke member 23(O) for strengthening the wheel 20 or for asthetic and styling purposes. The inner series of spoke members 23(I) also have bores 44 for attachment of a wheel brake drum (not shown).

A rim 21 has dual bead flanges 45 and 46 for seating the beads of a wide tire (not shown) on a conventional manner. The bead flanges 45 and 46 project radially outwardly from a conventional rim base having a well or "drop center" portion 47 and a lateral portion 48. The rim base portions 47 and 48 have conforming annular surfaces for integral attachment thereto, as by welds 49, of the radially outer ends or sides of two axially spaced-apart radially inwardly projecting mounting flanges referred to generally by the numeral 50. The inner mounting flange is indicated by 50(I). The outer mounting flange is indicated by 50(O).

As shown, four embodiments of a mounting flange 50 have a radially outer end portion 51, a medial or body portion with a radially inclined surface 52 and a terminal portion 53. The terminal portion 53 is radially directed substantially perpendicular to the rotational axis of the rim 21 and has a series of bores 54 therein for receiving an axially projecting component of a fastening assembly 22. The medial portion and terminal portion are functionally connected by a transitional portion, as indicated generally at 50(T).

Figures 5, 6:
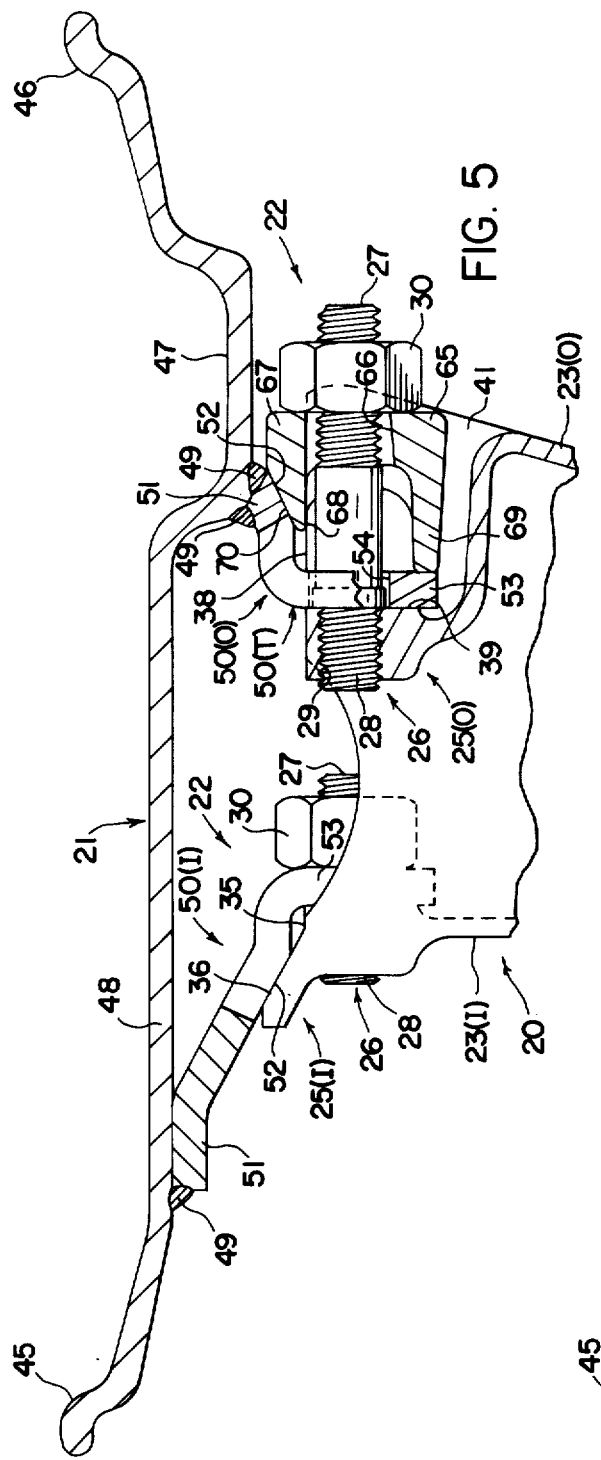
FIG. 5 is a sectional view, taken substantially as indicated on line 5—5 of FIG. 4.
FIG. 6 is a fragmentary companion view to FIG. 5, taken substantially as indicated on line 6—6 of FIG. 4.
Figure 7:
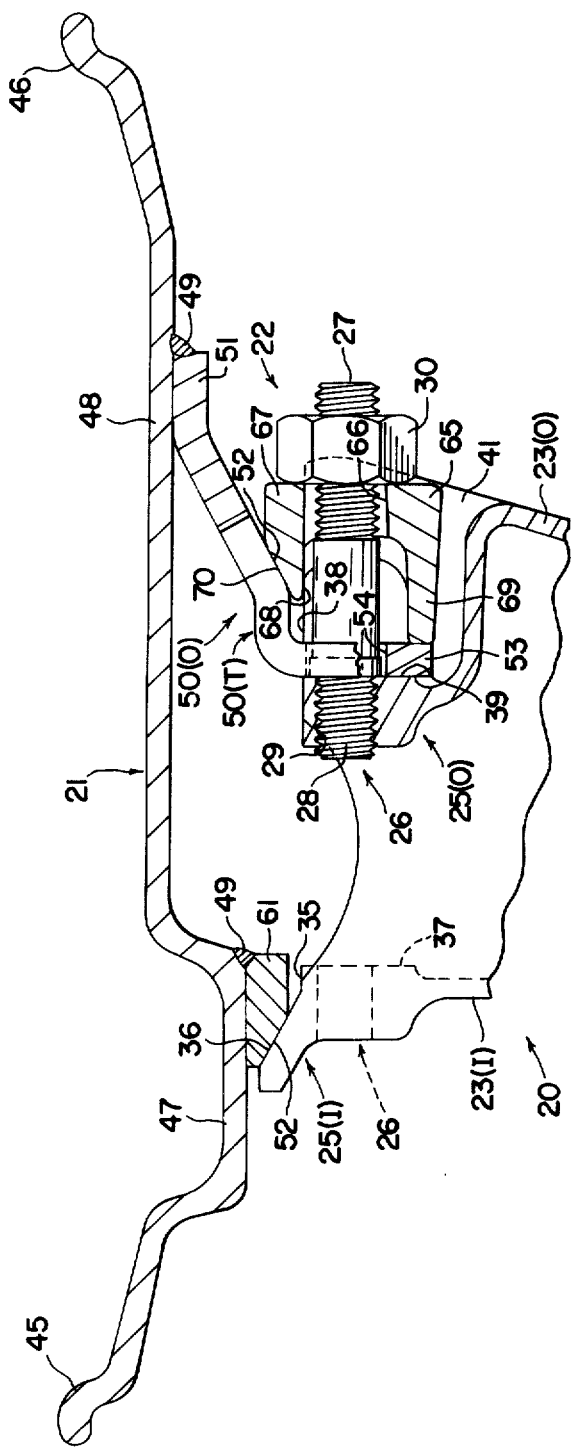
FIG. 7 is a sectional view of still another form of tire carrying rim seated and locked by a fastening assembly on a wheel felloe according to the invention.

The form of a mounting flange 50 as just described is used as the outer flange 50(O) in FIGS. 2 and 3 and FIG. 7, integrally attached as by welds 49 to the rim base lateral portion 48. In FIGS. 5 and 6, this form of a mounting flange 50 is used as the inner flange 50(I), integrally attached as by welds 49 to the rim base lateral portion 48; and is also used as the outer flange 50(O), integrally attached as by welds 49 to the rim base well portion 47. In the FIGS. 2 and 3 embodiments, the outer flange 50(O) transitional portion 50(T) has the terminal portion 53 integrally attached thereto, as by welds 55.

As shown, two embodiments of an inner flange 50(I) have an annular ring 61 integrally attached as by welds 49 to the rim base well portion 47. In FIGS. 2 and 3 and FIG. 7, the annular ring 61 has a radially inclined surface 52. In FIGS. 2 and 3, the axially outer side of the ring 61 has a terminal portion 53 integrally attached thereto, as by welds 62. This terminal portion 53 is also radially directed substantially perpendicular to the rotational axis of the rim 21 and also has a series of bores 54 therein for receiving an axially projecting component of a fastening assembly 22.

Referring to FIGS. 8 and 9, the inner mounting flange 50(I) has an axially directed radially outer portion 63 and a radially directed terminal portion 53. The outer portion 63 is integrally attached, as by welds 49, to the rim base well portion 47. The outer mounting flange 50(O) has a radially directed outer portion 64 and a terminal portion 53. The outer portion 64 is integrally attached, as by welds 49, to the rim base lateral portion 48. The terminal portions 53 of both the inner flange 50(I) and outer flange 50(O) are also radially directed substantially perpendicular to the rotational axis of the rim 21 and also have a series of bores 54 therein for receiving an axially projecting component of a fastening assembly 22.

Referring to FIGS. 2 and 3, 5 and 6, and 8 and 9, the terminal portion 53 of an inner mounting flange 50(I) is locked into full surface engagement with a radially directed surface 37 on an inner wheel felloe 25(I) by final tightening of a nut 30 rotatably mounted on a stud 27.

Referring to FIG. 8, the terminal portion 53 of an inner mounting flange 50(O) is locked into full surface engagement with a radially directed surface 39 on an outer wheel felloe surface 25(O) by final tightening of a nut 30 rotatably mounted on a stud 27.

Referring to FIGS. 2 and 3, and 5 and 7, a fastening assembly 22 for an outer mounting flange 50(O) may comprise an elongated stud 27, a clamp element 65 and a rotatably nut 30 threaded on the stud 27. A clamp element 65 has a bore 66 for receiving the stud 27. A clamp element 65 also has lateral wing portions 67 providing downward facing dual axially oriented surfaces 68 for seating on conforming wheel felloe surfaces 38. A clamp element 65 also preferably has an axially inwardly directed lower leg portion 69 for mating engagement against a flange terminal portion 53. The radially outer portion of a clamp element 65 has a radially inclined surface 70 for mating engagement with conforming flange surface 52. The terminal portion 53 of the inner mounting flange 50(O) is locked into full surface engagement with a radially directed surface 39 on an outer wheel felloe surface 25(O) by final tightening of a nut 30.

As shown in FIG. 7, the inner felloes 25(I) have no stud 27 at the mounting location 26. In the event that a wheel 20 was made, used or sold for use with other inner mounting flange 50(I) embodiments, or for use in mounting an inner dual rim, each inner felloe 25(I) could be provided with a stud 27.

In all embodiments wherein a mounting flange 50 has a terminal portion 53, the bores 54 therein are preferably radially elongate to facilitate initial mounting and placement of a relatively heavy tire and rim combination in alignment with the fastening assembly studs 27.

As shown, the inner and outer mounting flanges 50(I) and 50(O) are circumferentially continuous or annular elements. Alternatively, even though the cost of manufacture would be higher because of dimensional tolerances, each mounting flange 50 could comprise a series of discrete elements, one for each spoke member 23.

In those embodiments of a rim 21 as disclosed in FIGS. 1-7, the radially inclined surface 52 on a mounting flange 50 has a suitable angle relative to the rotational axis of the rim to provide a conical surface for mating engagement with either a wheel felloe surface 36 or surface 70 on the clamp elements 65.

What is claimed is:

1. A combination of a tire carrying rim mounted by fastening assemblies on a vehicle wheel,
    said wheel having two series of alternating spoke members, each of said series having an axially spaced-apart and staggered relation to the other of said series, each of said spoke members having a felloe comprising a radially directed surface substantially perpendicular to the rotational axis of said wheel and providing a mounting location for an axially projecting component of said fastening assemblies, said rim having bead flanges projecting radially outwardly from a rim base comprising a well portion and a lateral portion between said bead flanges, said rim having two axially spaced-apart radially inwardly projecting mounting flanges, one of said mounting flanges being integrally attached to said rim base well portion and the other of said mounting flanges being integrally attached to said rim base lateral portion, each of said mounting flanges having a radially directed terminal portion substantially perpendicular to the rotational axis of said rim and having a series of bores therein for receiving an axially projecting component of said fastening assemblies, whereby, said rim is mounted on said wheel by tightening of said fastening assemblies against each said mounting flange terminal portion and the full surface engagement of said terminal portions with said radially directed wheel felloe surfaces.

2. A combination of a tire carrying rim seated and locked by fastening assemblies on a vehicle wheel, said wheel having two series of axially spaced-apart and staggered, alternating inner and outer, spoke members, each of said inner spoke members having a felloe comprising a radially inclined surface and an adjacent radially directed surface substantially perpendicular to the rotational axis of said wheel and providing a mounting location for an axially projecting component of said fastening assemblies, each of said outer spoke members having a felloe comprising spaced-apart axially projecting wing portions providing outwardly facing dual axially oriented surfaces and a radially directed surface oriented transversely between said axially oriented surfaces substantially perpendicular to the rotational axis of said wheel and providing a mounting location for an axially projecting component of said fastening assemblies, said rim having bead flanges projecting radially outwardly from a rim base comprising a well portion and a lateral portion between said bead flanges, and rim having two axially spaced-apart inner and outer radially inwardly projecting mounting flanges, said inner mounting flange having an annular ring integrally attached to said rim base well portion with a radially inclined surface and an axially outer side carrying a radially directed terminal portion substantially perpendicular to the rotational axis of said rim and having a series of bores therein for receiving an axially projecting component of said fastening assemblies, said outer mounting flange being integrally attached to said rim base lateral portion, the medial portion of said outer mounting flange comprising a radially inclined surface, the terminal portion of said outer mounting flange being radially directed substantially perpendicular to the rotational axis of said rim and having a series of bores therein for receiving an axially projecting component of said fastening assemblies for said outer mounting flange, each said outer mounting flange fastening assembly comprising an axially projecting threaded fastener and a clamp element supported by said threaded fastener, each said clamp element having lateral wing portions providing downwardly facing dual axially oriented surfaces, an axially inwardly directed member and a radially outer portion comprising a radially inclined surface, whereby, said rim is seated on, and thereafter locked on, said inner and outer spoke members by tightening of said fastening assemblies and the mating engagement of said radially inclined surface on each said inner spoke felloe with said radially inclined surface on said inner mounting flange, and by the mating engagement of said radially directed surface on each said inner spoke felloe with said terminal portion on said inner mounting flange, and by the mating engagement of said radially directed surface on each said outer spoke felloe with said terminal portion on said outer mounting flange, and by the mating engagement of said radially inclined surface on said outer mounting flange with said radially inclined surface on said radially outer portion of each said clamp element of each said outer mounting flange fastening assembly, said downwardly facing dual axially oriented surfaces on said lateral wing portions of each said clamp element being in mating engagement with said outwardly facing dual axially oriented surfaces on each said outer spoke felloe and said axially inwardly directed member of each said clamp element being in mating engagement with said terminal portion on said outer mounting flange.

3. A combination of a tire carrying rim seated and locked by fastening assemblies on a vehicle wheel, said wheel having two series of axially spaced-apart and staggered, alternating inner and outer, spoke members, each of said inner spoke members having a felloe comprising a radially inclined surface and an adjacent radially directed surface substantially perpendicular to the rotational axis of said wheel and providing a mounting location for an axially projecting component of said fastening assemblies, each of said outer spoke members having a felloe comprising spaced-apart axially projecting wing portions providing outwardly facing dual axially oriented surfaces and a radially directed surface oriented transversely between said axially oriented surfaces substantially perpendicular to the rotational axis of said wheel and providing a mounting location for an axially projecting component of said fastening assemblies, said rim having bead flanges projecting radially outwardly from a rim base comprising a well portion and a lateral portion between said bead flanges, said rim having two axially spaced-apart inner and outer radially inwardly projecting mounting flanges, said inner mounting flange being integrally attached to said rim base lateral portion, the medial portion of said inner mounting flange comprising a radially inclined surface, the terminal portion of said inner mounting flange being radially directed substantially perpendicular to the rotational axis of said rim and having a series of bores therein for receiving an axially projecting component of said fastening assemblies, said outer mounting flange being integrally attached to said rim base well portion, the medial portion of said outer mounting flange comprising a radially inclined surface, the terminal portion of said outer mounting flange being radially directed substantially perpendicular to the rotational axis of said rim and having a series of bores therein for receiving an axially projecting component of said fastening assemblies for said outer mounting flange, each said outer mounting flange fastening assembly comprising an axially projecting threaded fastener and a clamp element supported by said threaded fastener, each said clamp element having lateral wing portions providing downwardly facing dual axially oriented surfaces, an axially inwardly directed member and a radially outer portion comprising a radially inclined surface, whereby, said rim is seated on, and thereafter locked on, said inner and outer spoke members by tightening of said fastening assemblies and the mating engagement of said radially inclined surface on each said inner spoke felloe with said radially inclined surface on said inner mounting flange, and by the mating engagement of said radially directed surface on each said inner spoke felloe with said terminal portion on said inner mounting flange, and by the mating engagement of said radially directed surface on each said outer spoke felloe with said terminal portion on said outer mounting flange, and by the mating engagement of said radially inclined surface on said outer mounting flange with said radially inclined surface on said radially outer portion of each said clamp element of each said outer mounting flange fastening assembly, said downwardly facing dual axially oriented surfaces on said lateral wing portions of each said clamp element being in mating engagement with said outwardly facing dual axially oriented surfaces on each said outer spoke felloe and said axially inwardly directed member of each said clamp element being in mating engagement with said terminal portion on said outer mounting flange.

4. A combination of a tire carrying rim seated and locked by fastening assemblies on a vehicle wheel, said wheel having two series of axially spaced-apart and staggered, alternating inner and outer, spoke members, each of said inner spoke members having a felloe comprising a radially inclined surface, each of said outer spoke members having a felloe comprising spaced-apart axially projecting wing portions providing outwardly facing dual axially oriented surfaces and a radially directed surface oriented transversely between said axially oriented surfaces substantially perpendicular to the rotational axis of said wheel and providing a mounting location for an axially projecting component of said fastening assemblies, said rim having bead flanges projecting radially outwardly from a rim base comprising a well portion and a lateral portion between said bead flanges, said rim having two axially spaced-apart inner and outer radially inwardly projecting mounting flanges, said inner mounting flange being an annular ring integrally attached to said rim base well portion with a radially inclined surface, said outer mounting flange being integrally attached to said rim base lateral portion, the medial portion of said outer mounting flange comprising a radially inclined surface, the terminal portion of said outer mounting flange being radially directed substantially perpendicular to the rotational axis of said rim and having a series of bores therein for receiving an axially projecting component of said fastening assemblies, each said fastening assembly comprising an axially projecting threaded fastener and a clamp element supported by said threaded fastener, each said clamp element having lateral wing portions providing downwardly facing dual axially oriented surfaces, an axially inwardly directed member and a radially outer portion comprising a radially inclined surface, whereby, said rim is seated on, and thereafter locked on, said inner and outer spoke members by tightening of said fastening assemblies and the mating engagement of said radially inclined surface on each said inner spoke felloe with said radially inclined surface on said inner mounting flange, and by the mating engagement of said radially directed surface on each said outer spoke felloe with said terminal portion on said outer mounting flange, and by the mating engagement of said radially inclined surface of said outer mounting flange with said radially inclined surface on said radially outer portion of each said clamp element of each said fastening assembly, said downwardly facing dual axially oriented surfaces on said lateral wing portions of each said clamp element being in mating engagement with said outwardly facing dual axially oriented surfaces on each said outer spoke felloe and said axially inwardly directed member of each said clamp element being in mating engagement with said terminal portion on said outer mounting flange.

* * * * *